No. 724,492. PATENTED APR. 7, 1903.
H. L. PALMER.
SERVING TRAY.
APPLICATION FILED JAN. 3, 1901.
NO MODEL.

Witnesses:

Henry L. Palmer
Inventor:
By Worth Osgood
Attorney.

UNITED STATES PATENT OFFICE.

HENRY L. PALMER, OF ROCKVILLE CENTER, NEW YORK.

SERVING-TRAY.

SPECIFICATION forming part of Letters Patent No. 724,492, dated April 7, 1903.

Application filed January 3, 1901. Serial No. 42,028. (No model.)

*To all whom it may concern:*

Be it known that I, HENRY L. PALMER, a citizen of the United States, and a resident of Rockville Center, county of Nassau, State of New York, have invented certain new and useful Improvements in Serving-Trays, of which the following is a full, clear, and exact description, reference being had to the accompanying drawings and to the letters marked thereon.

My invention relates to that class of devices known as "serving-trays" and employed for carrying and serving various articles, and is in several respects an improvement on the form shown in the patent granted to me February 20, 1894, No. 515,161.

The object of my present invention is to simplify and improve the construction and arrangement of the handle and its connection with the body of the tray.

Figure 1:
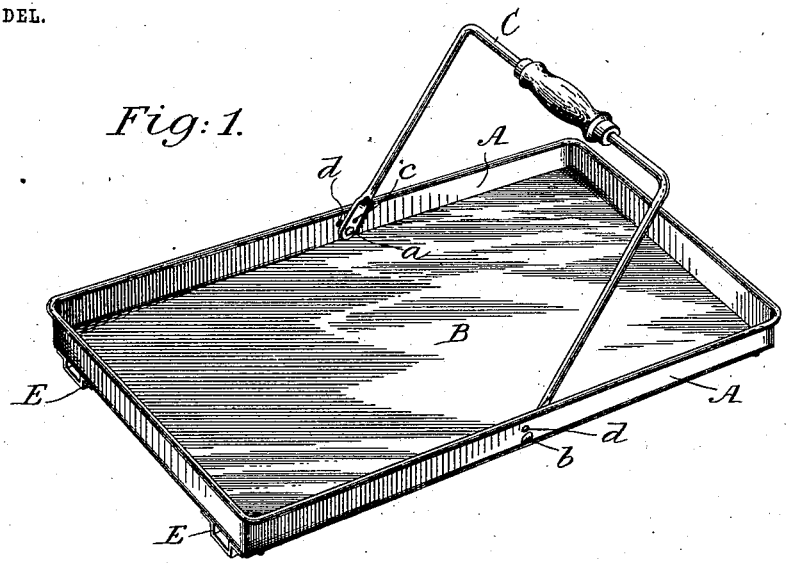
Figure 2:
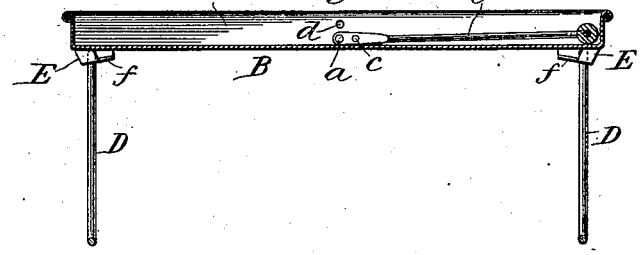

In the accompanying drawings, forming part of this specification, Figure 1 is a perspective view of a hand-tray constructed and arranged for operation in accordance with my invention and involving my improvements, the handle being represented in partly-elevated position and the legs or supports being turned up against the bottom of the tray, so that they do not show in this figure. Fig. 2 is a longitudinal sectional view of the tray, showing the handle turned down and the legs or supports extended, as when the tray is used for a table.

In both figures like letters of reference wherever they occur indicate corresponding parts.

The tray may be of any desired size and form, according to the uses for which it is intended.

A A are the walls, and B the bottom, these being preferably of sheet metal, but may be of other material, if desired.

C is the handle, shown of round metal, but which may be flat, if desired. This is hinged midway of the side walls on their inner sides and near the bottom of the tray, the hinge on each side being formed by the projecting pin $a$, formed with or applied to the handle C and passing through a recess provided for it in the side wall and being supplied on the outer extremity with a button or knob $b$, larger than the perforation. The purpose of this button is to prevent the pin $a$ from being dislodged from its seat. The handle C is of material sufficiently elastic so that when the two parallel portions are pressed toward each other they will resume their former position as soon as the pressure is removed.

On each side of the handle are short pins $c\ c$, which engage in perforations $d\ d$ in the side walls and located directly over the hinge-pins. When the handle is turned to an upright position, the pins $c\ c$ enter the perforations $d\ d$, and the handle is thus automatically locked in upright position, so that the tray may be used for carrying or serving various articles, the handle and tray being then immovable with respect to each other, as is desirable and practically necessary. Evidently knobs $b$ must be at a distance from handle C at least equal to the length of pins $c$ plus the thickness of the side walls of the tray. The pins $c\ c$ may be placed below the pins $a\ a$ instead of above them, if desired.

The handle may be turned down toward either end and within the tray. To unlock it from its upright position, it is only necessary to press the buttons $b\ b$ with the fingers, which will carry the pins $c\ c$ out of engagement with the perforations $d\ d$, and thus leave the handle free to be turned on the hinge-pins. When turned down, the handle occupies a position as shown in Fig. 2, and to return it again to its upright position it is only necessary to swing it up until the locking-pins $c\ c$ automatically snap into the perforations provided for them. When the handle is down, it is not locked, but is kept in place by its own weight and by the increased outward pressure against the tray-walls, owing to the increased tension given to the handle by operation of pins $c$ abutting against the side walls at points not perforated. This construction obviates the use of a separate spring and is simple, durable, reliable, and effective.

E E are blocks at the corners of the tray, to which legs may be secured in any suitable manner, said blocks and legs, however, not forming a part of my improvement.

Having now fully described my invention, what I claim as new herein, and desire to secure by Letters Patent, is—

The combination of a tray having side walls with two perforations in each side, at the center of their length, a spring-handle the ends of which fit inside the walls and tend to spread outward, pins $a$ with enlarged heads $b$ at the ends of the handle, the pins passing through two of said perforations in the walls, and short pins $c$ projecting outwardly from the handle near its ends, and adapted when the handle is upright to spring into holes $d$, heads $b$ being at a distance from the handle greater than the length of pins $c$, as set forth.

HENRY L. PALMER.

Witnesses:
C. SEDGWICK,
WORTH OSGOOD.